Dec. 25, 1951     R. R. LAMM     2,580,231
HANGER
Filed Dec. 6, 1947     2 SHEETS—SHEET 1
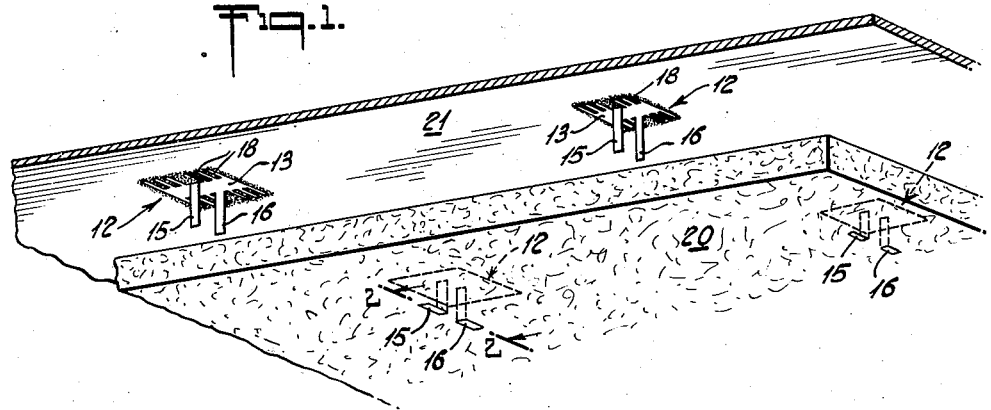
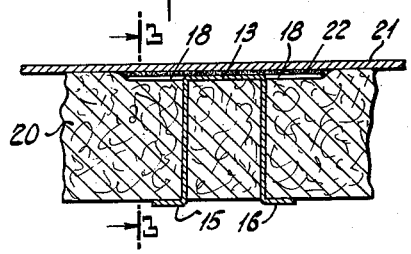
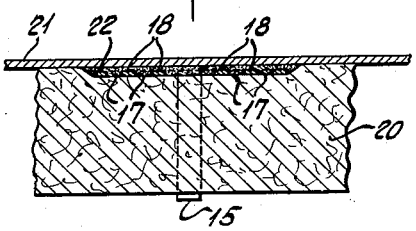
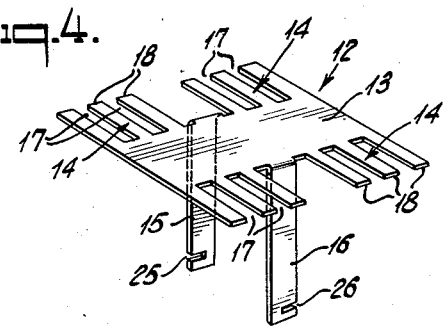
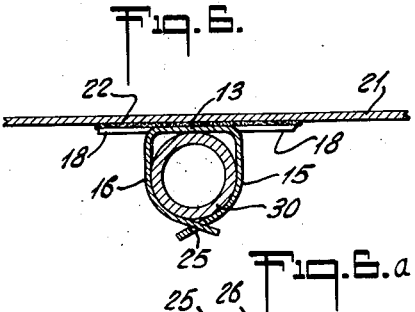
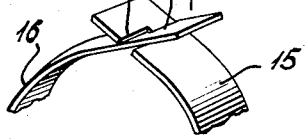
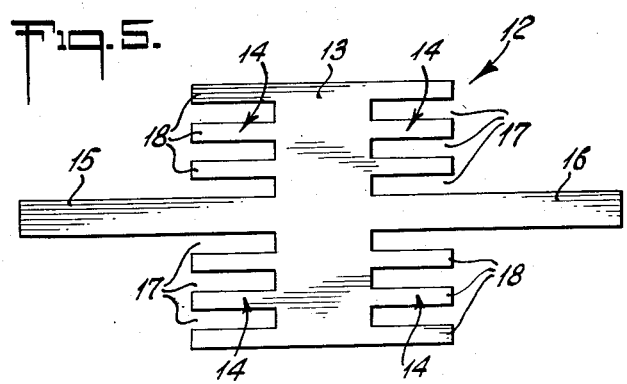
INVENTOR.
RAYMOND R. LAMM.
BY Samuel Stearman
ATTORNEY.

Dec. 25, 1951     R. R. LAMM     2,580,231
HANGER
Filed Dec. 6, 1947     2 SHEETS—SHEET 2
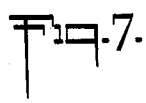
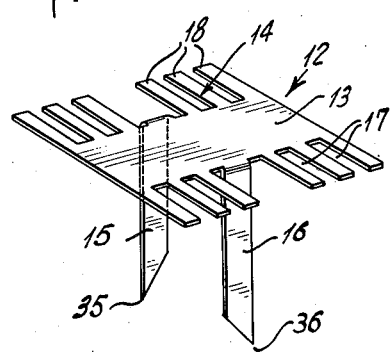
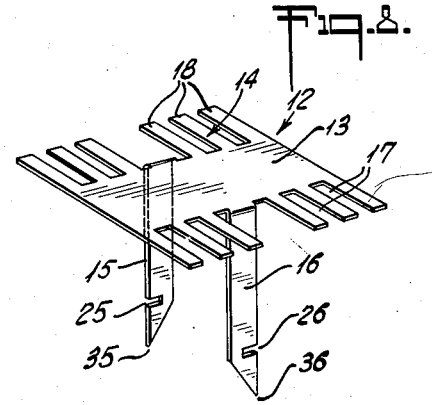
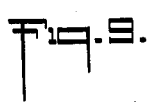
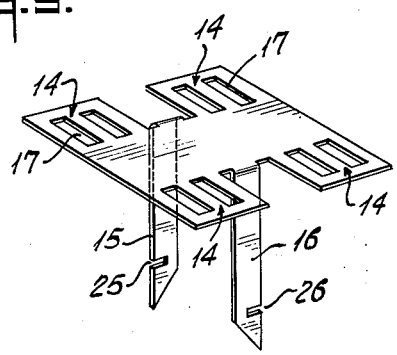
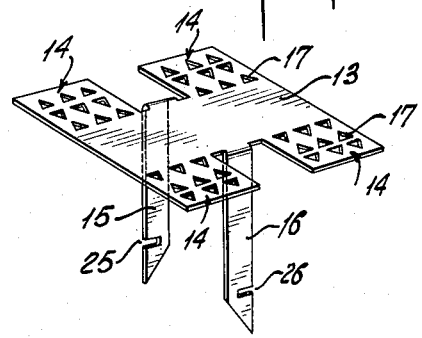
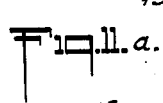
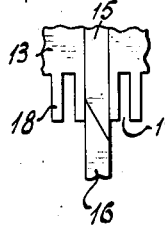
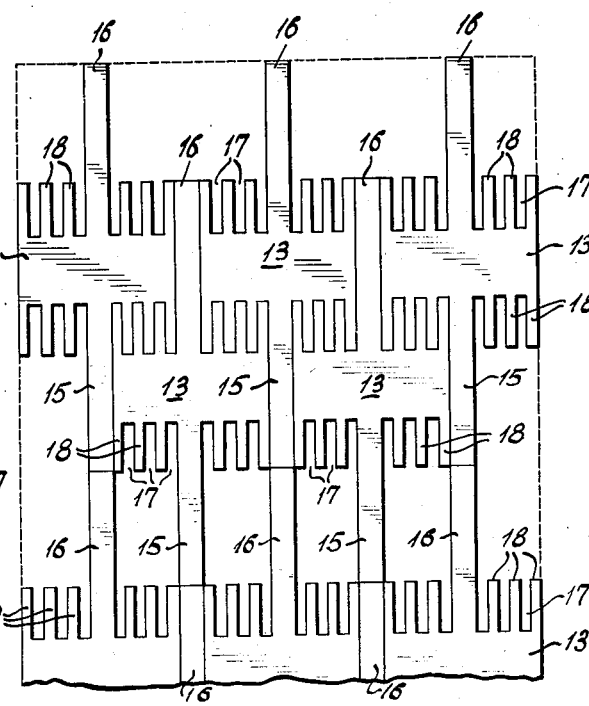
INVENTOR.
RAYMOND R. LAMM.
ATTORNEY.

Patented Dec. 25, 1951

2,580,231

UNITED STATES PATENT OFFICE 2,580,231

HANGER

Raymond R. Lamm, Philadelphia, Pa., assignor to The Patent and Licensing Corporation, New York, N. Y., a corporation of Massachusetts Application December 6, 1947, Serial No. 790,189

6 Claims. (Cl. 248—300)

This invention relates to fastening and supporting devices of the type which are cementitiously secured to a supporting surface. The invention is primarily concerned with a device for supporting insulation, lath, pipe, conduit or the like.

Fastening and supporting devices which are adapted to be secured to a supporting surface by means of an adhesive are of growing importance, for example, in the construction fields where it is frequently necessary to fasten insulation boards, plaster lath, conduit, etc., to metal, concrete or ceramic surface or other surfaces to which conventional hangers cannot be readily screwed or bolted. Welding, even when practicable, is a relatively expensive and time-consuming procedure. Various devices have been proposed but they have been found to involve a complicated and expensive manufacturing procedure, to have limited application, to require special tools for their application, or to suffer from other disadvantages.

It is an object of the invention to provide an improved fastening device of the character indicated which can be cementitiously secured to a wall or ceiling or other surface, easily and rapidly, and which can be satisfactorily used without special tools or instruments.

It is a further object of the invention to provide a fastening device which is relatively light in weight and which may be packaged and shipped in a minimum of space.

It is a still further object of the invention to provide a fastening device which can be easily and economically cut, stamped or otherwise formed, from a continuous sheet or strip of material of uniform thickness.

According to the invention, there is provided a device having a winged body portion which is adapted to be cementitiously applied to a supporting surface, and relatively flexible arms extending outwardly from the body, the arms being coplanar with the body when manufactured and shipped but being readily bent out of the plane of the body to accommodate and hold objects of various sizes and shapes.

A feature of the invention resides in the arrangement of the arms of the device whereby the device may be employed to support sheet materials of various thicknesses.

Another feature of the invention resides in the structure of the arms of the device whereby the device may be adapted to support either sheet material such as insulation blankets or tubular material such as pipe.

Other features and advantages of the invention will be apparent from the detailed description which follows and from the accompanying drawings in which:

Fig. 1 is a perspective view of devices embodying the invention showing the manner in which they may be used to support insulation sheets or blankets or other sheet material on a wall or ceiling;

Fig. 2 is a view in cross-section along the line 2—2 of Fig. 1;

Fig. 3 is a view in cross-section along the line 3—3 of Fig. 2;

Fig. 4 is a perspective view of one embodiment of the device of the invention in a form adapted for use as a pipe hanger;

Fig. 5 is a plan view of an embodiment of the invention showing the monoplanar form in which it is manufactured and shipped until ready for use, Fig. 6 is a view in cross-section showing the device securely holding a pipe against a supporting surface;

Fig. 6a is an enlarged view in perspective of the arms of the device shown in Fig. 6 illustrating the manner in which the arms may be interlocked;

Figs. 7 to 10 are views in perspective of other embodiments of the invention;

Fig. 11 is a plan view of the strip or blank from which the device of the invention may be cut, showing the manner in which the device adapts itself to being cut therefrom with a maximum economy of material; and Fig. 11a shows the method of pointing the ends of the arms.

Referring to the drawings, the numeral 12 designates generally a fastening and supporting device of the invention. This device comprises a body portion 13, wing portions 14 extending in opposite directions from opposing edges of the body portion and a pair of arms 15 and 16 similarly extending in opposite directions centrally from opposing edges of the body portion and beyond the outer margins of the wing portions. Each of the wing portions 14 is provided with a number of apertures 17. The apertures 17 shown in the embodiments of the invention illustrated in Figs. 1–8 are in the form of spaced recesses or notches extending inwardly from the outer edges of the wing portions 14, leaving the wing portions in the form of spaced fingers or tabs 18. The spaced recesses shown in Figs. 1–8 represent the preferred form of the apertures 17. The apertures may, however, take other forms. Referring particularly to Figs. 9 and 10, embodiments of the invention are shown in which the apertures 17 are in the form of openings which lie wholly within the marginal edges of the wing portions 14 and which may be of rectangular or triangular outline.

The device is constructed of flexible sheet material such as sheet steel of say 24 to 26 gauge. Thus, the device may be stamped or cut as a single piece from a sheet of material with the body, wings and arms of the device in coplanar relationship. As thus formed, the device can be conveniently accumulated in uniform stacks and packaged. The arms 15 and 16 are flexible and when the device is used, they are easily bent in any desired manner to accommodate the particular thickness of the insulation or other material or object to be held.

Referring particularly to Fig. 1, the device of the invention is shown supporting sheets 20 of insulating material, such as mineral wool or cork, against a ceiling 21. It will be observed that the fastening device is secured to the ceiling 21 by a suitable adhesive 22. In applying the device as shown, the arms 15 and 16 are bent at right angles to the body portion 13 and the body portion and wing portions 14 are dipped in a supply of adhesive and then pressed against the ceiling with the arms extending downwardly. Owing to the apertures, the adhesive not only covers the surface of the device which is pressed against the ceiling but also forms a continuous binder film along the edges of each aperture. A firm bonding of the device to the supporting surface is thus effected. Furthermore, the apertures facilitate the evaporation of solvent from the adhesive. The adhesive dries from the edges of the apertures inwardly and insures a firm bonding in minimum time. The sheets of insulation or other material to be applied are then pressed against the outwardly bent arms 15 and 16 of each device. The arms penetrate the sheets and the portions of the arms which extend beyond the lower face of the sheets are readily bent parallel to the face, as shown clearly in Fig. 2.

An embodiment of the device of the invention adapted for use as a support for pipe or conduit as well as for insulation sheets is shown in Fig. 4. Arms 15 and 16, which are shown bent at right angles to the body portion, are provided with notches 25 and 26, respectively, extending inwardly from opposite edges thereof. As shown in Figs. 6 and 6a, when the arms 15 and 16 are bent into a loop, notches 25 and 26 can be interlocked to form a pipe hanger in which a pipe 30 may be inserted and securely supported. If desired, additional notches are conveniently made in arms 15 or 16, or both, whereby pipe or conduit of various sizes may be firmly held in loops formed by interlocking complementary notches.

Other embodiments of the invention, showing the manner in which the arms may be modified, are shown in Figs. 7 and 8. Referring particularly to Fig. 7, the arms 15 and 16 have been cut diagonally at the ends thereof to provide points 35 and 36, respectively. These points facilitate the penetration of the arms through the board or sheet to be supported. Fig. 8 shows an embodiment of the invention, in which the arms 15 and 16 are provided both with points 35 and 36 and with notches 25 and 26.

Referring particularly to Figs. 11 and 11a, there is shown the manner in which the device 12 having apertures 17 of the preferred form, i. e., recesses extending inwardly from the marginal edges of the wing portions 14, may be most economically cut from a continuous parent sheet of material such as sheet metal. It will be observed that when cut in the specific manner illustrated in Fig. 11, the length of the arms 15 and 16 is equal to the aggregate width of the body portion and the two opposed wing portions.

It will be apparent that various modifications in the structure of the fastening device illustrated may be made without departing from the scope of the invention as defined in the appended claims and it is therefore intended that the drawings and the foregoing description shall be interpreted as illustrative and not in a limiting sense.

I claim:

1. A fastening and supporting device adapted to be cementitiously applied to a supporting surface, comprising a substantially rectangular body portion, a pair of spaced substantially rectangular wing portions extending outwardly from each of two opposite sides of said body portion, and an arm portion disposed between each of said pairs of wing portions, said arm portions being integral with and extending outwardly from said opposite sides of said body portion substantially beyond the outer margins of said wing portions and being adapted to be bent at right angles to the plane of the body portion and wing portions, each of said wing portions being of substantially greater width than said arm portions and being provided with a plurality of apertures.

2. A fastening and supporting device adapted to be cementitiously applied to a supporting surface, comprising a substantially rectangular body portion, a pair of spaced substantially rectangular wing portions extending outwardly from each of two opposite sides of said body portion, and an arm portion disposed between each of said pairs of wing portions, said arm portions being integral with and extending outwardly from said opposite sides of said body portion substantially beyond the outer margins of said wing portions and being adapted to be bent at right angles to the plane of the body portion and wing portions, each of said wing portions being of substantially greater width than said arm portions and being provided with a plurality of spaced recesses extending inwardly from the outer marginal edges of said wing portions.

3. A fastening and supporting device adapted to be cementitiously applied to a supporting surface, comprising a substantially rectangular body portion, a pair of spaced substantially rectangular wing portions extending outwardly from each of two opposite sides of said body portion, and an arm portion disposed between each of said pairs of wing portions, said arm portions being integral with and extending outwardly from said opposite sides of said body portion substantially beyond the outer margins of said wing portions and being adapted to be bent at right angles to the plane of the body portion and wing portions, each of said wing portions being of substantially greater width than said arm portions and being provided with a plurality of spaced rectangular recesses extending inwardly from the outer marginal edges of said wing portions, whereby to define intervening spaced fingers.

4. A fastening and supporting device adapted to be cementitiously applied to a supporting surface, comprising a substantially rectangular body portion, a pair of spaced substantially rectangular wing portions extending outwardly from each of two opposite sides of said body portion, and an arm portion pointed at its free end disposed between each of said pairs of wing portions, said arm portions being integral with and extending outwardly from said opposite sides of said body portion substantially beyond the outer margins of said wing portions and being adapted to be bent at right angles to the plane of the body portion and wing portions, each of said wing portions being of substantially greater width than said arm portions and being provided with a plurality of spaced rectangular recesses extending inwardly from the outer marginal edges of said wing portions, whereby to define intervening spaced rectangular fingers.

5. A fastening and supporting device adapted to be cementitiously applied to a supporting surface, comprising a substantially rectangular body portion, a pair of spaced substantially rectangular wing portions extending outwardly from each of two opposite sides of said body portion, and an arm portion disposed between each of said pairs of wing portions, said arm portions being integral with and extending outwardly from opposite sides of said body portion substantially beyond the outer margins of said wing portions and being adapted to be bent at right angles to the plane of the body portion and wing portions, each of said wing portions being of substantially greater width than said arm portions and being provided with a plurality of spaced recesses extending inwardly from the outer marginal edges of said wing portions, and each of said arm portions being provided with complementary locking recesses whereby one arm portion may be interlocked with the other arm portion when the arms are bent in the form of a loop.

6. A fastening and supporting device adapted to be cementitiously applied to a supporting surface, comprising a substantially rectangular body portion, a pair of spaced substantially rectangular wing portions extending outwardly from each of two opposite sides of said body portion, and an arm portion disposed between each of said pairs of wing portions, said arm portions being integral with and extending outwardly from said opposite sides of said body portion substantially beyond the outer margins of said wing portions and being adapted to be bent at right angles to the plane of the body portion and wing portions, each of said wing portions being of substantially greater width than said arm portions and being provided with a plurality of spaced rectangular recesses extending inwardly from the outer marginal edges of said wing portions, whereby to define intervening spaced rectangular fingers, the said recesses and the said fingers being of the same width and the length of each of said arms being equal to the distance from the outer marginal edge of one wing portion to the outer marginal edge of the wing portion on the opposite side of the body portion.

RAYMOND R. LAMM.

REFERENCES CITED

The following references are of record in the file of this patent:

UNITED STATES PATENTS

| Number | Name | Date |
|---|---|---|
| 1,767,575 | Bujack | June 24, 1930 |
| 2,382,945 | Trafton | Aug. 14, 1945 |
| 2,386,887 | Eckel | Oct. 16, 1945 |